United States Patent [19]
Funakubo et al.

[11] Patent Number: 5,111,474
[45] Date of Patent: May 5, 1992

[54] LASER OSCILLATOR DEVICE

[75] Inventors: Tsutomu Funakubo, Fujiyoshida; Norio Karube, Machida, both of Japan

[73] Assignee: Fanuc Ltd., Minamitsuru, Japan

[21] Appl. No.: 733,011

[22] Filed: Jul. 19, 1991

Related U.S. Application Data

[63] Continuation of Ser. No. 457,774, filed as PCT/JP89/00526, May 25, 1989, abandoned.

[30] Foreign Application Priority Data

Jun. 16, 1988 [JP] Japan ................. 63-148918

[51] Int. Cl.$^5$ ..................... H01S 3/03; H01S 3/22
[52] U.S. Cl. ........................... 372/61; 372/55; 372/58
[58] Field of Search ..................... 372/55, 58, 61; 415/55.6

[56] References Cited

U.S. PATENT DOCUMENTS

| | | | |
|---|---|---|---|
| 4,351,052 | 9/1982 | Sasaki et al. | 372/58 |
| 4,504,954 | 3/1985 | Güers et al. | 372/61 |
| 4,817,111 | 3/1989 | Nilsen et al. | 372/58 |
| 4,907,240 | 3/1990 | Klingel | 372/58 |
| 4,923,364 | 5/1990 | Nilsen et al. | 415/55.6 |

Primary Examiner—Georgia Y. Epps
Attorney, Agent, or Firm—Staas & Halsey

[57] ABSTRACT

A laser oscillator device comprises an electric-discharge tube for producing an electric discharge in a laser gas contained in the electric-discharge tube for laser excitation, an optical resonator for effecting laser oscillation, and a gas circulating device having a gas blower and a cooling unit for forcibly cooling the laser gas. The gas blower has an impeller that is rotatable in the laser gas and bearings that are lubricated by grease. With this arrangement, contamination of the optical parts is prevented and the device can easily be maintained.

3 Claims, 5 Drawing Sheets

LASER OSCILLATOR DEVICE

This application is a continuation, of application Ser. No. 07/457,774, filed as PCT/JP89/00526, May 25, 1989, now abandoned.

TECHNICAL FIELD

The present invention relates to a high-power laser such as a machining $CO_2$ laser or the like, and more particularly to a $CO_2$ laser oscillator device which is small in size and light in weight and has improved oscillation characteristics, reliability, and maintainability.

BACKGROUND ART

FIG. 4 of the accompanying drawings shows a conventional $CO_2$ laser oscillator device. The laser oscillator device includes an electric-discharge tube 1 having an output coupling mirror 2 and a total reflection mirror 3 that are positioned at respective opposite ends of the electric-discharge tube 1. Metal electrodes 4, 5 are installed on the outer circumference of the electric-discharge tube 1. When a high-frequency voltage is applied between the metal electrodes 4, 5 by a high-frequency power supply 6, a high-frequency glow discharge is produced in the electric-discharge tube 1 for laser excitation. A laser beam axis in the electric-discharge tube 1 is indicated by the reference numeral the 13, whereas laser beam axis extending out of the tube 1 from the output coupling mirror 2 is indicated by the reference numeral 14.

To start the laser oscillator device, gas is first evacuated from the device by a vacuum pump 12. Then, a valve 11 is opened to introduce a prescribed amount of laser gas from a gas container 10 into the device until the pressure of the gas in the device reaches a predetermined pressure level. Subsequently, gas from the device is continuously evacuated by vacuum pump 12 and the supply of gas in the device is continuously replenished through the valve 11. The laser gas in the device is therefore continuously replaced with fresh gas while the gas pressure in the apparatus is maintained at the predetermined pressure level. In this manner, contamination of the laser gas in the device is avoided.

In the device of FIG. 4, the laser gas is circulated by a gas blower 9 so that the laser gas is cooled. In a $CO_2$ gas laser, about 20% of the applied electric energy is converted into the laser beam, and the rest is consumed to heat the laser gas. According to theory, however, since increases in laser oscillation are proportional to the minus (3/2)th power of the absolute temperature T, it is necessary to forcibly cool the laser gas in order to increase the oscillation efficiency. In the illustrated device, the laser gas flows through the electric-discharge tube 1 in the direction indicated by the arrows at a speed of about 100 m/sec, and the same is then introduced into a cooling unit 8. The cooling unit 8 mainly removes the heat energy produced by the electric discharge from the laser gas. Since the gas blower 9 heats the laser gas as it compresses the same, the same from gas blower 9 is passed through a cooling unit 7 before the same is reintroduced into the electric-discharge tube 1. The cooling units 7, 8 will not be described in detail as they are well known in the art.

FIG. 5 shows the construction of a conventional turbo blower used as the gas blower 9. An impeller 16 is rotated at a high speed of about 100,000 RPM by an electric motor comprising a rotor 17 mounted on a shaft 26 and a stator 18. Therefore, the volume of the turbo blower is smaller than that of a roots blower which rotates at a lower speed, the volume being in inverse proportion to the rotational speed. The shaft 26 is supported by bearings 19, 20 having rolling elements. Since the turbo blower rotates at a high speed, the bearings 19, 20 are lubricated by an oil jet or by oil air lubrication whereby oil is periodically supplied to the bearings. FIG. 5, an oil supply unit 21 atomizes oil with the laser gas, and supplies the atomized oil to the bearings 19, 20 through passages 22, 23.

The conventional laser oscillator device illustrated in FIGS. 4 and 5 has the following problems:

The first problem is that the oil used for lubricating the bearings 19, 20, tends to be mixed into the laser gas and contaminates the optical components, resulting in a reduction in the laser output power and a mode change. In view of this, the laser gas in the high-power $CO_2$ gas laser must be continuously replaced, and the expense required to replace the laser gas accounts for a considerable portion of the operational cost of the laser oscillator device. Even if the laser gas is constantly replaced, the optical parts need to be replaced or cleaned. Therefore, the maintenance of the laser oscillator device requires a large expenditure of labor.

A second problem arises when too much oil is supplied to the bearings. This results in the production of an increased loss of energy because the oil in the bearings is stirred, and the bearings are affected by the temperature of the oil. The oil supply unit therefore requires sophisticated control and is highly costly.

The third problem is that the oil passages frequently become clogged because their diameter is small, and when they are clogged, the oil can no longer be supplied, causing seizure of the bearings.

DISCLOSURE OF THE INVENTION

In view of the aforesaid problems of conventional laser oscillator device, it is an object of the present invention to provide a gas laser devices including a gas blower having bearings that are lubricated by grease.

To achieve this object the present invention provides a laser oscillator device comprising an electric-discharge tube for producing an electric discharge in a laser gas contained in the electric-discharge tube for laser excitation, an optical resonator for effecting laser oscillation, and a gas circulating device having a gas blower and a cooling unit for forcibly cooling the laser gas, said gas blower comprising a turbo blower having an impeller that is rotatable in the laser gas and having grease lubricated bearings.

Furthermore, there is also provided a laser oscillator device in which two impellers are arranged to apply thrust forces in opposite directions.

Since the roller bearings of the turbo blower are lubricated by grease, the optical parts are not contaminated by oil, and there is no need for replenishment of oil once a suitable amount of grease is placed in the bearing at the time the laser oscillator device is assembled. Therefore, the turbo blower requires no maintenance. And the cost of the turbo blower is reduced since no oil supply unit is employed.

In one embodiment, the impellers are arranged to apply thrust forces in opposite directions. Therefore, the thrust forces are balanced to thereby increase the stability of the blower, and thrust loads on the bearings are reduced so that the service life of the bearings is increased.

BEST MODE FOR CARRYING OUT THE INVENTION

An embodiment of the present invention will hereinafter be described with reference to the drawings.

Figure 1:
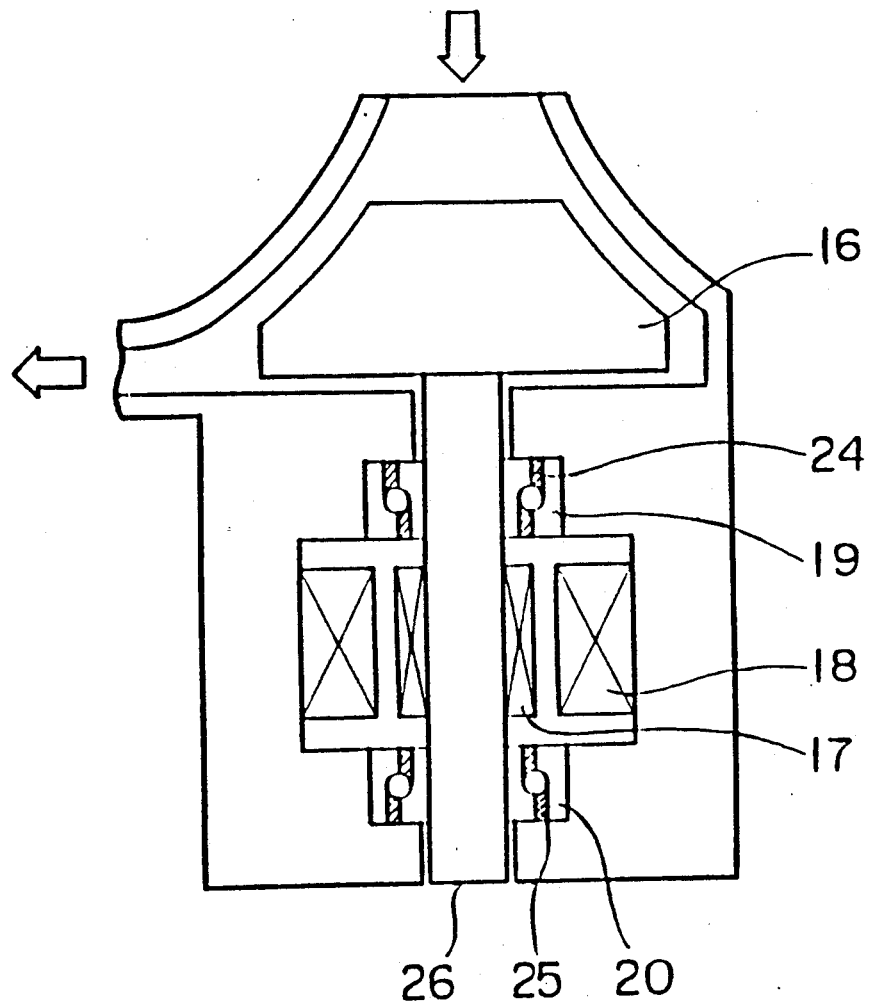
FIG. 1 is a cross-sectional view of a turbo blower for use with a laser having a laser output power of about 1 KW, according to the present invention.
Figure 5:
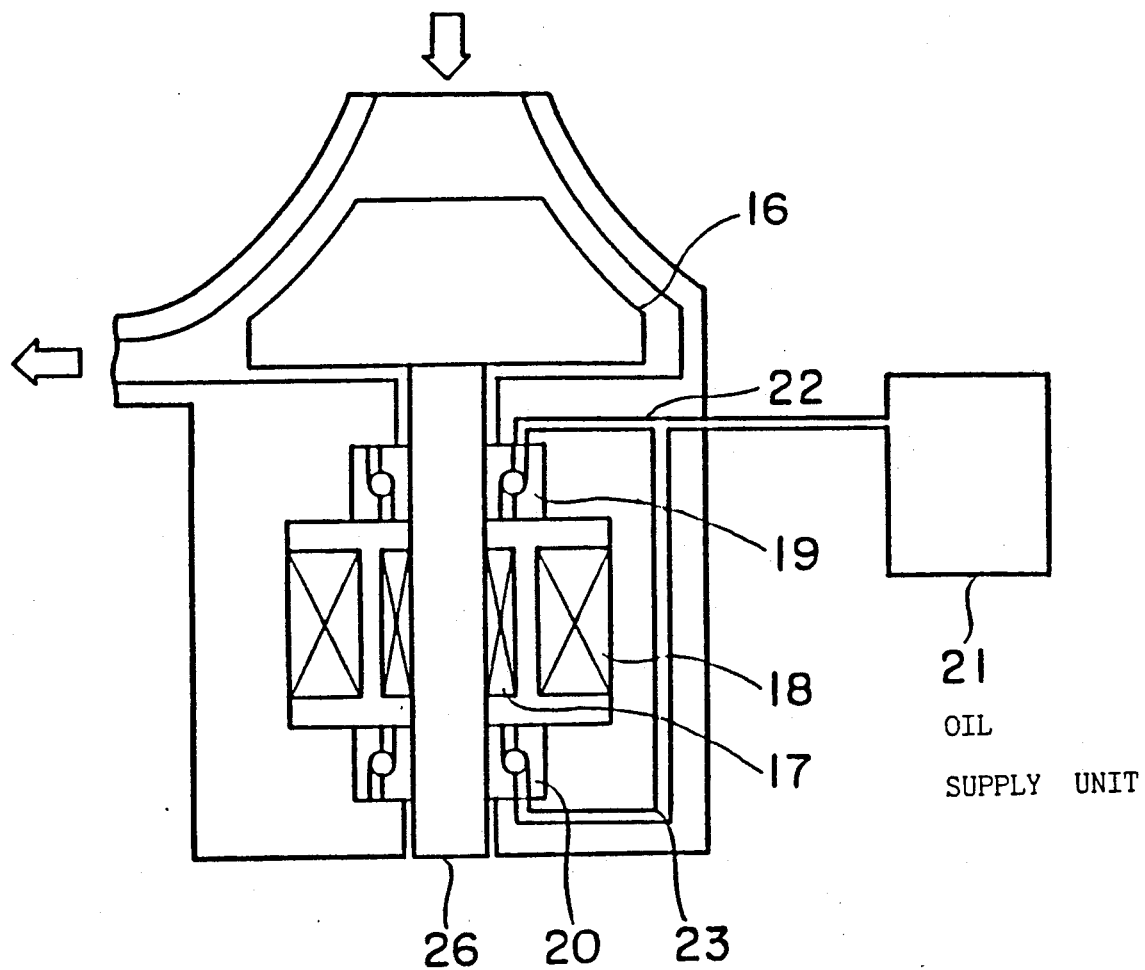
FIG. 5 is a cross-sectional view of a conventional laser turbo blower.

FIG. 1 shows a laser oscillator device according to an embodiment of the present invention. Those parts in FIG. 1 which are identical to those of FIG. 5 are denoted by identical reference numerals, and will not be described in detail below. An impeller 16 is shown as being a centrifugal impeller, but may be a mixed flow impeller or an axial flow impeller.

Suitable amounts of grease 24, 25 are filled in spaces around the rolling elements and holders that is, between the inner and outer races of the roller bearings 19, 20. The grease to be used may be lithium grease, sodium grease, or the like.

Figure 2:
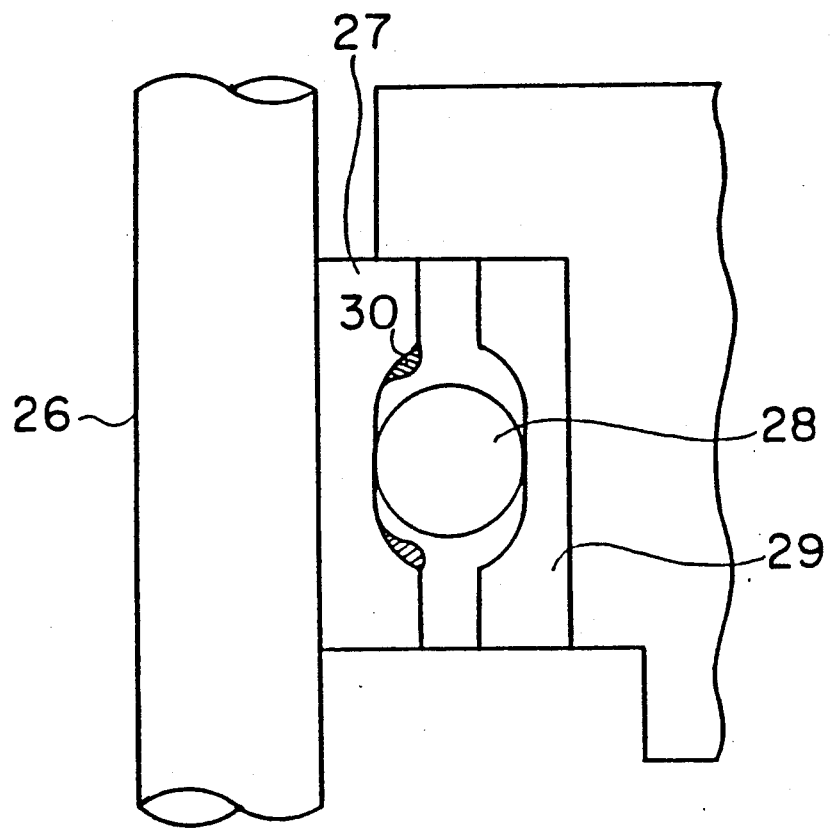
FIG. 2 is a fragmentary view showing the manner in which a roller bearing is lubricated by grease.

FIG. 2 shows a lubricating structure for a bearing. The bearing has an inner race 27 that is fixedly mounted on the shaft 26 for rotation in synchronism therewith. Rolling elements 28 which are sandwiched between the inner race 27 and an outer race 29 also rotate with shaft 26. As a result, banks of grease 30 are formed on both sides of the groove of the inner race 27 by centrifugal forces. As can be seen from FIG. 1, the bearing structure 19 operates in an environment which is at the same pressure as exists within the impeller chamber. During rotation, oil gradually oozes from the grease 30, forming lubricating oil films between the inner race 27 and outer race 29 and the rolling elements 28.

The turbo blower shown in FIG. 1 is employed in a laser oscillator device having an output power of about 1 KW. Although higher output power can be achieved by employing a larger impeller, a smaller impeller is preferable from the standpoint of cost.

Figure 3:
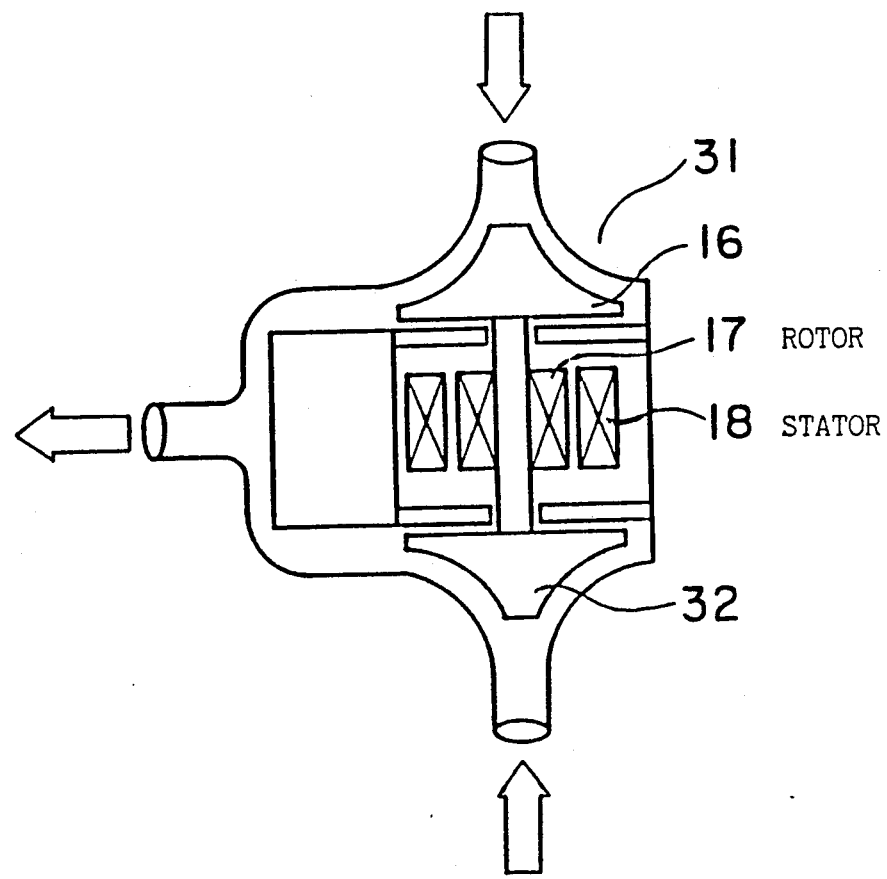
FIG. 3 is a cross-sectional view of a turbo blower for use with a laser having a laser output power of about 2 KW.
Figure 4:
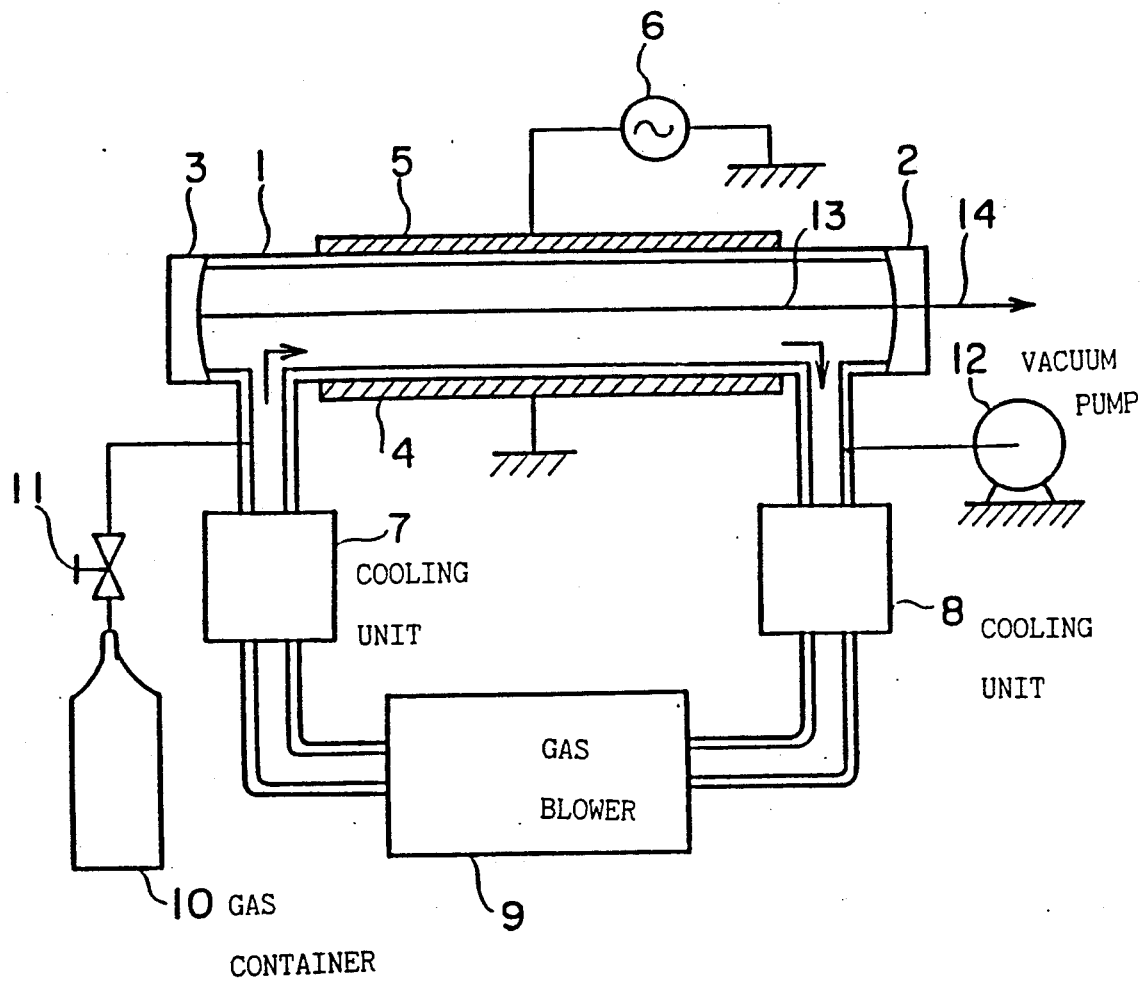
FIG. 4 is a schematic view showing a conventional laser oscillator device for a $CO_2$ laser.

FIG. 3 illustrates the structure of a turbo blower for use in a laser oscillator device having an output power of about 2 KW. The turbo blower is generally indicated by the reference numeral 31. Bearings are omitted from illustration of FIG. 3 as they are identical to those shown in FIG. 1. The laser gas flows into the laser turbo blower in the directions indicated by the arrows. Impellers 16 and 32 are mounted on the upper and lower ends of the shaft respectively. The arrangement of FIG. 3 is more advantageous from the standpoint of cost since two impellers can be used while only one set of bearings and one motor is employed. The motor is composed of the rotor 17 and the stator 18. With the impellers mounted on the same shaft, variations in thrust loads are canceled out, thrust loads are greatly reduced, stability is increased, and the service life is highly increased.

With the present invention, as described above, the bearings of the blower are lubricated by grease. Since only the required minimum amount of oil oozes from the grease, the optical parts are not contaminated by oil, and the laser output power and laser beam characteristics are not degraded. Additional oil need does not to be supplied simply because a certain amount of grease is installed in the bearings at the time the laser oscillator device is assembled, and hence the maintenance such as oil replenishment is not required.

Since no oil supply unit is required, the cost of the laser oscillator device is low.

Inasmuch as the impellers are arranged to apply thrust forces in opposite directions in one embodiment, the thrust forces are balanced to thereby increase stability, and reduce the thrust loads on the bearings, thus increasing the service life of the bearings.

We claim:

1. A laser oscillator device comprising an electric-discharge tube for producing an electric discharge in a laser gas contained in the electric-discharge tube for laser excitation, an optical resonator for effecting laser oscillation, and a gas circulating device having a gas blower and a cooling unit for forcibly cooling the laser gas, said gas blower comprising a turbo blower having an impeller casing and two impellers that are rotatable in laser gas within the casing and which are mounted on a single shaft for applying thrust loads in opposite directions, said turbo blower having grease lubricated bearings which are operated without positive pressure fluid sealing means.

2. A laser oscillator device according to claim 1, wherein the electric-discharge tube produces an electric discharge at a high frequency in the laser gas for laser excitation.

3. A laser oscillator device according to claim 1, wherein the laser oscillator device comprises an axial-flow laser.

* * * * *

UNITED STATES PATENT AND TRADEMARK OFFICE
CERTIFICATE OF CORRECTION

PATENT NO. : 5,111,474

DATED : May 5, 1992

INVENTOR(S) : FUNAKUBO TSUTOMU and NORIO KARUBE

It is certified that error appears in the above-identified patent and that said Letters Patent is hereby corrected as shown below:

Column 1, line 27, after "numeral" delete "the";

line 28, after "whereas" insert --the--;

line 55, delete the comma ",";

line 59, before "from" delete "same" and substitute --laser gas--;

line 61, delete "same".

Column 2, line 8, before "FIG." insert --In--;

line 20, delete "cost" and substitute --costs--;

line 39, delete "device" and substitute --devices--;

line 40, delete "devices" and substitute --device--;

line after "object" insert a comma --,--.

Column 3, line 27, after "in" insert --the--;

line 28, delete the comma ",".

Column 4, line 1, before "illustration" insert --the--;

line 18, delete "need does not" and substitute --does not need--;

UNITED STATES PATENT AND TRADEMARK OFFICE
CERTIFICATE OF CORRECTION

PATENT NO. : 5,111,474

DATED : May 5, 1992

INVENTOR(S) : FUNAKUBO TSUTOMU AND NORIO KARUBE

It is certified that error appears in the above-identified patent and that said Letters Patent is hereby corrected as shown below:

Column 4, line 28, before "and' delete the comma ",".

Signed and Sealed this

Twenty-first Day of September, 1993

Attest:

BRUCE LEHMAN

Attesting Officer     Commissioner of Patents and Trademarks